US012380240B2

United States Patent
Saillet et al.

(10) Patent No.: US 12,380,240 B2
(45) Date of Patent: Aug. 5, 2025

(54) PROTECTING SENSITIVE DATA IN DOCUMENTS

(71) Applicant: International Business Machines Corporation, Armonk, NY (US)

(72) Inventors: Yannick Saillet, Stuttgart (DE); Albert Maier, Tuebingen (DE); Mike W. Grasselt, Leinfelden-Echterdingen (DE); Michael Baessler, Bempflingen (DE); Lars Bremer, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 17/032,592

(22) Filed: Sep. 25, 2020

(65) Prior Publication Data

US 2022/0100899 A1    Mar. 31, 2022

(51) Int. Cl.
*G06F 21/62* (2013.01)
(52) U.S. Cl.
CPC ............... *G06F 21/6254* (2013.01)
(58) Field of Classification Search
CPC .................................. G06F 21/6254
See application file for complete search history.

(56) References Cited

U.S. PATENT DOCUMENTS

| | | | |
|---|---|---|---|
| 10,614,236 | B2 | 4/2020 | Antonatos et al. |
| 11,429,744 | B2 | 8/2022 | Taniguchi |
| 2006/0129507 | A1 | 6/2006 | Pontoppidan |
| 2013/0167192 | A1 | 6/2013 | Hickman et al. |
| 2014/0304243 | A1 | 10/2014 | Ramesh |
| 2015/0134827 | A1* | 5/2015 | Shah .................. H04L 67/1095 709/226 |

(Continued)

FOREIGN PATENT DOCUMENTS

| | | |
|---|---|---|
| CN | 107480549 A | 12/2017 |
| CN | 108259491 A | 7/2018 |

(Continued)

OTHER PUBLICATIONS

Firestore, "Index types in Cloud Firestore", 15 pages, Apr. 21, 2020, obtained from https://web.archive.org/web/20200421141353/https://firebase.google.com/docs/firestore/query-data/index-overview (Year: 2020).*

(Continued)

*Primary Examiner* — Jeffrey D. Popham
(74) *Attorney, Agent, or Firm* — Edward J. Wixted, III (57) ABSTRACT

In an approach, a processor receives a request of a document. A processor identifies a set of datasets comprising a sensitive dataset, the set of datasets being interrelated in accordance with a relational model. A processor extracts attribute values of the document. A processor determines that a set of one or more attribute values of the extracted attribute values is in the set of datasets, the set of attribute values being values of a set of attributes. A processor determines that one or more entities of the sensitive dataset can be identified based on relations of the relational model between the set of attributes, where at least part of attribute values of the one or more entities comprises sensitive information. A processor, responsive to determining that the one or more entities can be identified, masks at least part of the set of one or more attribute values in the document.

12 Claims, 7 Drawing Sheets

(56) References Cited

U.S. PATENT DOCUMENTS

| | | | |
|---|---|---|---|
| 2015/0169895 A1 | 6/2015 | Gkoulalas-Divanis et al. | |
| 2018/0253562 A1 | 9/2018 | Spyridon et al. | |
| 2019/0026488 A1 | 1/2019 | Kurtin | |
| 2019/0156060 A1* | 5/2019 | Maier | G06N 20/00 |
| 2019/0228100 A1* | 7/2019 | Potu | G06F 40/205 |
| 2019/0272387 A1* | 9/2019 | Gkoulalas-Divanis | G06F 21/604 |
| 2019/0286849 A1* | 9/2019 | Oberhofer | G06F 21/6254 |
| 2021/0287069 A1* | 9/2021 | Mumcuyan | G06N 3/045 |

FOREIGN PATENT DOCUMENTS

| | | | |
|---|---|---|---|
| CN | 116194922 A | 5/2023 | |
| EP | 3190765 A1 | 7/2017 | |
| JP | 2017-532649 A | 12/2019 | |
| JP | 2020-077339 A | 5/2020 | |
| JP | 2023-542632 A | 10/2023 | |
| WO | 2017187207 A1 | 11/2017 | |
| WO | 2019/180599 A1 | 9/2019 | |
| WO | 2022/064348 A1 | 3/2022 | |

OTHER PUBLICATIONS

"IBM InfoSphere Optim Data Privacy for Unstructured Data V2.8 protects against breaches of sensitive unstructured data to help secure your organization", IBM United States Software Announcement 219-513, dated Nov. 12, 2019, 9 pages, <https://www.ibm.com/downloads/cas/US-ENUS219-513-CA/name/US-ENUS219-513-CA.PDF>.

Sanchez et al., "Detecting sensitive information from textual documents: an information-theoretic approach", Rovira i Virgili University, 12 pages, <https://crises-deim.urv.cat/web/docs/publications/lncs/702.pdf>, Nov. 2012.

Japan Patent Office, "Notice of Reasons for Refusal," Dec. 17, 2024, 9 Pages, JP Application No. 2023-515337.

International Searching Authority, "Notification of Transmittal of the International Search Report and the Written Opinion of the International Searching Authority, or Declaration," Patent Cooperation Treaty, Dec. 30, 2021, 09 pages, International Application No. PCT/IB2021/058567.

* cited by examiner

PROTECTING SENSITIVE DATA IN DOCUMENTS

BACKGROUND

The present invention relates generally to the field of computer system security, and more particularly to protecting sensitive data in documents.

Data protection and keeping sensitive information private is very important for companies and their customers. However, technical challenges about data privacy protection is growing with a trend of moving services to third parties and into the cloud and with increased diversity of data.

Hickman et al. (US 2013/0167192 A1) (hereinafter Hickman) describes "[s]ystems, methods and computer-readable media for applying policy enforcement rules to sensitive data. An unstructured data repository for storing unstructured data is maintained. A structured data repository for storing structured data is maintained. Request for information is received. The request is analyzed to determine its context. Based on the context, a policy enforcement action associated with generating a response to the request is identified. The policy enforcement action may be to remove sensitive data in generating the response to the request and/or mask sensitive data in generating a response to the request. An initial response to the request is generated by retrieving unstructured data from the unstructured data repository. Using the structured data maintained in the structured data repository, sensitive data included within the initial response is identified. The policy enforcement action is applied to the sensitive data included within the initial response to generate the response to the request." (Hickman, Abstract).

Current approaches parse a document, identify different classes of information contained in the document, and mask the sensitive information, while keeping as much non-sensitive information as possible. A disadvantage of such current processes is that such processes only consider the information contained in the document to retrieve and neglects other sources of information that a ready of the document might be able to use to reconstruct the sensitive information that has been masked.

SUMMARY

Aspects of an embodiment of the present invention disclose a computer-implemented method, computer program product, and computer system. A processor receives a request of a document. A processor identifies a set of datasets comprising a sensitive dataset, the set of datasets being interrelated in accordance with a relational model. A processor extracts attribute values of the document. A processor determines that a set of one or more attribute values of the extracted attribute values is in the set of datasets, the set of attribute values being values of a set of attributes, respectively. A processor determines that one or more entities of the sensitive dataset can be identified based on relations of the relational model between the set of attributes, where at least part of attribute values of the one or more entities comprises sensitive information. A processor, responsive to determining that the one or more entities can be identified, masks at least part of the set of one or more attribute values in the document. The may particularly be advantageous by masking one or more attribute values in documents in order to protect sensitive data.

Embodiments of the present invention optionally include an approach for classifying the extracted attribute values, and masking each attribute value of the extracted attribute values that is classified as sensitive attribute value. This may enable embodiments of the present invention to apply the classification-based approach on the requested document. For example, the attribute values may be classified as sensitive based on a data access rule. This may particularly be advantageous if the requested document comprises both the sensitive and non-sensitive information.

Embodiments of the present invention optionally include an approach for creating an index of the set of datasets such that each attribute value of the set of datasets may be associated with a table and column of the table to which said attribute value belongs, and querying the index in order to determine that the set of one or more attribute values of the extracted attribute values is comprised in the set of datasets. This may enable an efficient and simplified search without having to query the whole datasets. This may particularly be advantageous by using a Solr index, Lucene index or Elastic Search index.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The document may be a structured or unstructured document. By contrast to a structured document, the unstructured document may comprise unstructured information that either does not have a predefined data model or is not organized in a predefined manner. This may make difficult an understanding of such documents using programs as compared to data stored in fielded form in databases or annotated in documents of structured documents. The document may, for example, be an electronic document. The electronic document may be an electronic media content that is intended to be used in either an electronic form or as printed output. The electronic document may comprise, for example, a web page, a document embedded in a web page and that may be rendered in the web page, spreadsheet, email, book, picture, and presentation that have an associated user agent such as a document reader, editor or media player.

A typical application scenario for documents may include loading a document and displaying it on interfaces to different users. However, this may result in data which includes sensitive information being copied to a less-trusted environment. The sensitive information may comprise values of attributes (named sensitive attributes). The sensitive attributes may be privacy attributes. The privacy attributes may comprise social-security numbers, passport data, credit card numbers, health-record details, etc. which should not be leaked to untrusted parties. The sensitive information in accordance with the present subject matter may further comprise values of attributes (named non-sensitive attributes) which are not sensitive; however, these non-sensitive attribute values may be used to obtain/reconstruct sensitive information. Thus, by masking at least one of the sensitive attribute values and the combinable non-sensitive attribute values, the present subject matter may enable an optimal data masking. The purpose of data masking may be to de-sensitize the data, so as to hide or mask sensitive data items, such that the data as a whole remains useful for its intended purpose. The data masking may be performed so that the access to the document fulfils predefined data access rules. The data access rules may comprise governance policies and/or user access rights. For example, the governance rules may require to protect any kind of sensitive information such as personal information.

The masking of sensitive information may be performed by identifying in the document attribute values which are classified as sensitive and masking them in the document. This masking method may be referred to as classification-based masking method. For example, the document may be parsed for identifying the different classes of information contained in the document, and the sensitive information may be masked based on their classes. The classification may, for example, be performed by comparing values in the document with a predefined list of sensitive values or finding values in the document which match a regular expression or other classification techniques indicating that the identified value is of sensitive nature (e.g., finding values matching an email address or credit card number). The masking may be performed while keeping as much non sensitive information as possible, so that the document may still be evaluated by a requestor of the document. Additionally, or alternatively, the present subject matter may further mask non-sensitive attribute values, wherein a combination of said non-sensitive attribute values in the document may be used to derive valid sensitive information. This derivation may be possible as other sources of information may be used to reconstruct the sensitive information from the non-sensitive attribute values. The derived sensitive information may, for example, be part of the one already masked in the document or may be new sensitive information.

Hence, the present subject matter may provide the computer system which may provide a better data protection in unstructured documents, not only by analyzing the direct information contained in the document, but also by analyzing the indirect information which can be used to reconstruct sensitive information with the help of additional source of information. For that, embodiments of the present subject matter may make use of existing data. For example, the computer system may be configured to access several data storage systems e.g., in a cloud environment, and query their data. The existing data may enable to determine whether a combination of attribute values in a document may or may not lead to sensitive information. This may particularly be advantageous in case the existing data is stored in accordance with a relational model. The relational model may define relationships between the set of datasets. A relationship between two datasets may be a link between one or more columns/attributes of a dataset to other one or more columns of the other dataset. In case of databases, the relationship may, for example, be a primary foreign key (PK-FK) relationship. In another example, the relationship may comprise a link from one document to another document such as a link from an XML document pointing to another document containing more information on the same entity, or a link from an unstructured document containing related information. An entity has a distinct and separate existence. An entity has certain attributes or features, which may be assigned values. For example, a student is an entity. The attributes for a student's entity may be a roll number, name, date of birth and class. The entity may be represented with a respective record of a dataset. If the data are stored as triplets in a triple store (e.g., RDF data) or the data are stored in a graph DB, the relationship may be a link between one entity to another entity. The relationships may, for example, enable to join the set of datasets together, so that the records of the set of datasets representing a same entity may be merged in a new single record of a joined dataset representing the combined information contained in the set of datasets for the same entity. The combined information may thus reveal confidential data of that entity. For example, the relational model may define relationships between the set of datasets e.g., DS1, DS2 and DS3 as follows. The attribute a1 of the dataset DS1 is also present in the dataset DS2 and the attributes a2 and a3 of the dataset DS2 are also present in DS3. That is, the dataset DS1 has a relationship (relation) with the dataset DS2 and the dataset DS2 has a relationship with the dataset DS3. Assuming, for example, that the dataset DS3 is the sensitive dataset. The relational model may indicate that there are two paths that relate DS1 to DS3 via DS2. The first path a1-a2 may be defined by attributes a1 and a2 and the second path a1-a3 may be defined by attributes a1 and a3. The relational model may be used to identify data in the sensitive dataset without having to read the content of the set of datasets. That is, if the extracted attribute values comprise values of attributes a1 and a2, then the user may use the two attribute values to find the corresponding one or more records of the dataset DS3 via the relationships. However, if the extracted attribute values comprise only a value of the attribute a1, then no record of the dataset DS3 may be identified using the attribute value a1.

The at least part of the set of attribute values to be masked may, for example, comprise all attribute values of the set of attribute values. This may enable a confident and secure approach for protecting sensitive information. In another example, the present subject matter may enable to protect sensitive information while keeping as much non sensitive information as possible, so that the document may still be evaluated by a requestor of the document. For that and according to one embodiment, the masking of the at least part of the set of attribute values comprises: repeatedly performing the second determining step, wherein in each iteration a reduced set of attributes is used, wherein the reduced set of attributes is obtained by excluding one or more attributes from the set of attributes. The repetition results in one or more reduced sets of attributes that do not enable to identify the one or more entities, wherein the at least part of the set of attribute values are values of the set of attributes minus a selected set of the resulting reduced sets. In other words, the at least part of the set of attribute values to be masked are remaining values of the set of attributes excluding the selected reduced set. Assuming, for example, that the set of attributes comprises attributes b1, b2, b3, b4 and b5 and the selected reduced set comprises attributes b1, b3 and b4. That is, the combination of b1, b3 and b4 does not allow to identify/reconstruct the one or more entities. In this case, the at least part of the set of attribute values to be masked are values of b2 and b5.

According to one embodiment, the selected set is the reduced set with the highest number of attributes.

According to one embodiment, the repetition is performed until the resulting one or more reduced sets of attributes is higher than a predefined minimum number.

According to one embodiment, the approach further comprises classifying the extracted attribute values, and masking each attribute value of the extracted attribute values that is classified as sensitive attribute value. This may enable embodiments of the present invention to apply the classification-based approach on the requested document. For example, the attribute values may be classified as sensitive based on a data access rule. This may particularly be advantageous if the requested document comprises both the sensitive and non-sensitive information.

According to one embodiment, the approach further comprises: creating an index of the set of datasets such that each attribute value of the set of datasets may be associated with a table and column of the table to which said attribute value belongs, and querying the index in order to determine that the set of one or more attribute values of the extracted attribute values is comprised in the set of datasets. This may enable an efficient and simplified search without having to query the whole datasets. This may particularly be advantageous by using a Solr index, Lucene index or Elastic Search index.

According to one embodiment, the approach further comprises determining a domain represented by a content of the document, wherein the set of datasets represent the determined domain. This may enable an efficient method as it may prevent unnecessary processing of datasets which would not contain the attribute values as they may belong to a completely remote domain.

According to one embodiment, the set of datasets are tables of a relational database.

According to one embodiment, determining the one or more entities comprises: joining tables of the set of datasets that comprise the set of attribute values, and determining whether the joining results in one or more records of the sensitivity dataset. The one or more records represent the one or more entities respectively. This may make use of existing database systems in order to quickly find out the one or more entities.

According to one embodiment, the approach further comprises: in case the one or more entities can be identified, determining whether a non-masking of one or more attribute values of the one or more entities would violate the data access rule, wherein the masking is performed in case the data access rule would be violated. This may particularly be advantageous as the classification of sensitive information may be location and time dependent. In another example, the masking of the set of attribute values may be performed unconditionally in case the one or more entities can be identified. This is because the sensitive dataset is initially classified as sensitive. This may be advantageous in case of a uniform definition of sensitive data.

According to one embodiment, the data access rule indicates at least one of: which attribute values may not be accessed from a location of a requestor of the document, which attribute values may not be copied to a location of the requestor, which attribute values may not be accessed by the requestor.

Hence, the present approach may enable a secure communication method. It may, for example, prevent sending sensitive information to fraudulent users. For that, the sensitive information may need to be masked whenever a document is loaded and shown to a user who is not entitled to see the personal information.

Figure 1:
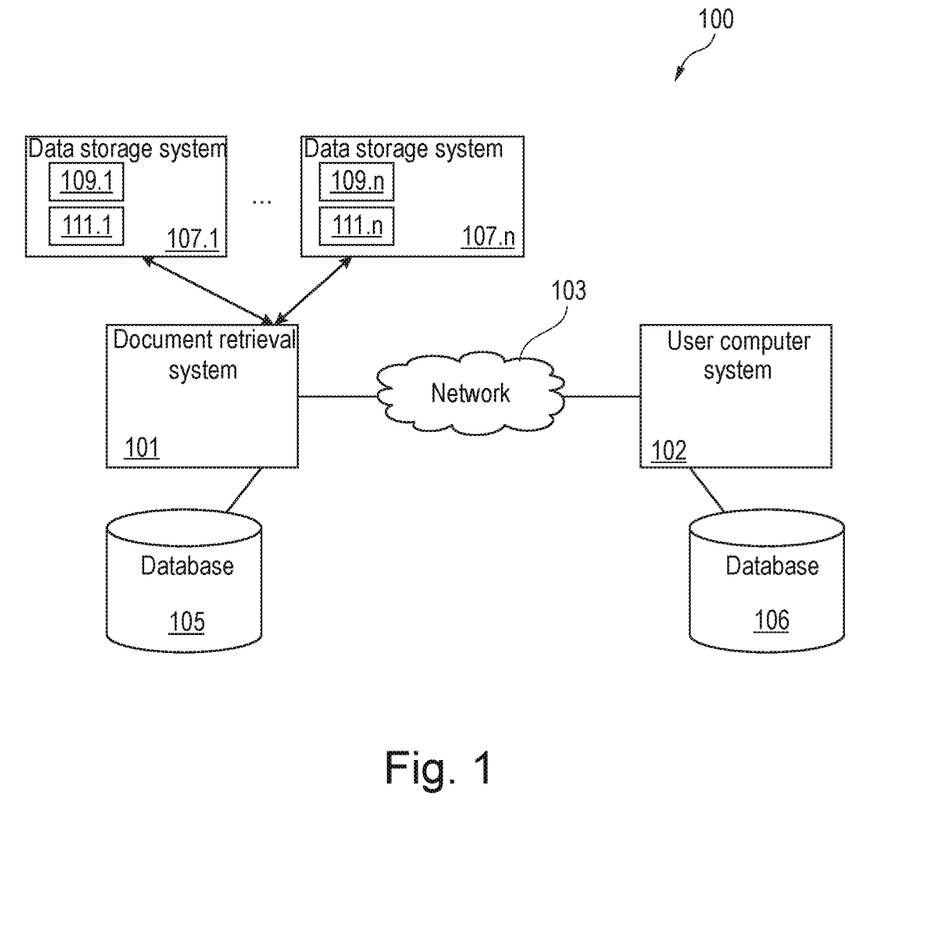
FIG. 1 is a block diagram of a system in accordance with an embodiment of the present invention.

FIG. 1 is a block diagram illustrating a document provider system 100 in accordance with an example of the present subject matter. The document provider system 100 comprises a document retrieval system 101 and a user computer system 102. The document retrieval system 101 and the user computer system 102 may be operable for communication via a network 103. The network 103 may, for example, be the Internet, a local area network, a wide area network and/or a wireless network.

The document retrieval system 101 has access to documents in a storage, represented here by a database 105, operatively coupled to the document retrieval system 101. The database 105 contains documents to be sent the user computer system 102 in operation. These documents may be any type of mainly unstructured text, such as newspaper articles, real estate records or paragraphs in a manual. The document retrieval system 101 may enable document retrieval. The document retrieval may be defined as a matching of some stated user query of the user computer system 102 against one or more documents in the database 105.

The document retrieval system 101 may be configured to protect sensitive information in accordance with the present subject matter. For example, the document retrieval system 101 may implement a dynamic data masking process whereby documents may be accessed, masked and sent to the user computer system 102 as required. In particular, the document to be sent to the user computer system 102 may contain certain attribute values which may be masked before the document is sent out. Such attribute values to be masked may be predetermined attribute values and/or dynamically determined attribute values based on a requestor of the document. For example, the attribute values to be masked may dynamically be determined based on the context in which the document is requested or is to be sent to the user computer system 102. For example, depending on the data access rules, the same document might be masked differently depending on the locations of the user computer system 102 and the user submitting the query to access the document. For example, European (EU) or united states (US) data may be masked according to General Data Protection Regulation (GDPR) or Federal Law. Such attribute values to be masked may further comprise attribute values identified in accordance with the present subject matter.

The user computer system 102 may receive the masked document via the network 103 and stores the masked document in storage, represented here by database 106, operatively coupled to the user computer system 102.

The document retrieval system 101 may be configured to access one or more data storage systems 107.1 through 107.*n*. Each of the data storage systems 107.1 through 107.*n* may store datasets 109.1 through 109*n* respectively. The datasets may be stored in a data storage system in accordance with a relational model. Examples of a dataset include, but are not limited to, a single file, a collection of files, a portion of a file, a database, a portion of a database, a logical volume(s), a volume group(s), etc. The data stored in the data storage systems 107.1 through 107.*n* may represent a set of one or more domains. A domain represents concepts or categories which belong to a part of the world, such as biology or politics. The domain typically models domain-specific definitions of terms. For example, a domain can refer to healthcare, advertising, commerce, medical and/or biomedical-specific field. The documents stored in the database 105 may represent at least one domain of the set of domains. The data storage systems 107.1 through 107.*n* may comprise metadata 111.1 through 111.*n* respectively, descriptive of the datasets stored in the data storage systems 107.1 through 107.*n*.

Figure 2:
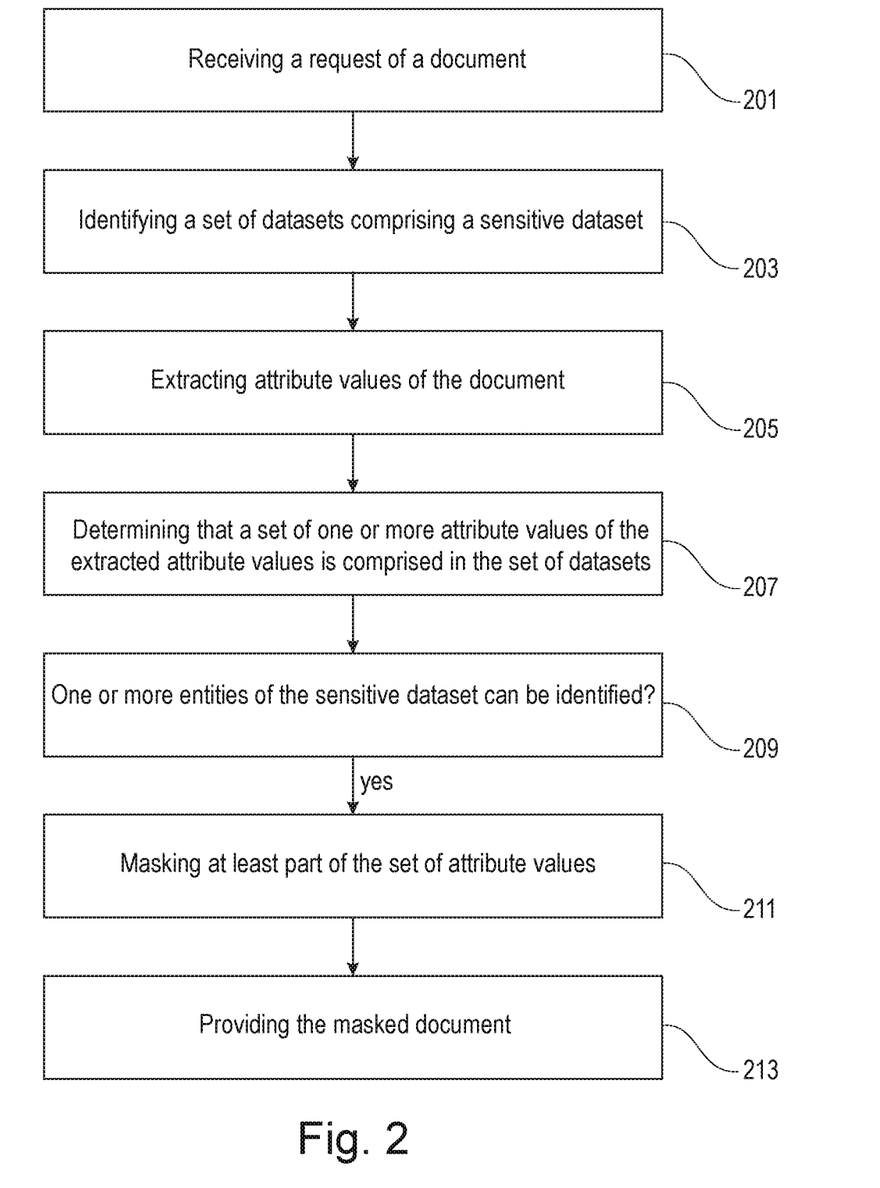
FIG. 2 is a flowchart of an approach for protecting sensitive information in documents in accordance with an embodiment of the present invention.

FIG. 2 is a flowchart of an approach for protecting sensitive information in a document. For the purpose of explanation, the approach described in FIG. 2 may be implemented in the system illustrated in FIG. 1, but is not limited to this implementation. The method of FIG. 2 may, for example, be performed by the document retrieval system 101.

In step 201, document retrieval system 101 receives a request of a document. The request may, for example, be a user query that may range from multi-sentence full descriptions of an information need to a few words. Document retrieval system 101 may receive the request of the document from the user computer system 102. The user computer system 102 may, for example, receive a data analysis request from a user of the user computer system 102. The data analysis request may comprise natural language data. A natural language processing of the data analysis request may be performed by the user computer system resulting in the request that is sent by the user computer system 102. In another example, the user may use a web search engine of the user computer system 102 to perform web searches. For example, the user may search the web for particular information specified in a textual web search query, the request comprising said textual web search query. The term "user" refers to an entity e.g., an individual, another computer, or an application executing on the user computer system 101.

Upon receiving the request, the document retrieval system 101 may identify in step 203 a set of datasets comprising a sensitive dataset. The set of datasets are related in accordance with a relational model. For that, the document retrieval system 101 may, for example, process the request to determine the domain that is represented by the requested data. This may, for example, be performed by performing a natural language processing of the received request. Based on the determined domain, the document retrieval system 101 may select the set of datasets as datasets of one or more of the data storage systems 107*a* through 107.*n* that have data representing the same determined domain. Moreover, the document retrieval system 101 may determine using the metadata 111.1-*n* of the selected database systems whether the datasets stored therein comprise sensitive information. For example, in case the selected data storage system is a database system, the document retrieval system 101 may determine using the metadata 111.1-*n* whether the datasets contain PII/sensitive fields. In another example, the set of datasets may be all datasets 109.1-*n* stored in the data storage systems 107.1-*n*.

The identified set of datasets may further be processed by the present approach in order to enable a simplified search in the set of datasets. The processing may be performed based on the structure of the identified set of datasets. For example, in case the identified set of datasets are tables of a database, the document retrieval system 101 may catalog all available structured tables of the set of datasets, the classification of the data they contain, as well as the relationships between these tables (e.g., indicating how they can be joined with each other). Moreover, the document retrieval system 101 may index all values contained in these structured tables. This may result in an index. The indexing may, for example, be performed by loading content of the set of datasets into a Solr index using a Solr API or into a Lucene index or into an Elastic Search index. The index may, thus, be the Solr index.

The document retrieval system 101 may extract in step 205 from the requested document stored in the database 105 attribute values of the document. In one example, a predefined pool of attributes may be provided. The document may be searched to determine if it contains a value of any of the predefined attributes. The found attribute values may be the extracted attribute values. In another example, the attribute values may be extracted by performing a rule-based and/or a statistical method. The rule-based method may contain pattern matching and focus on areas of analysis and pattern matching. This approach may rely on specialized areas of background knowledge. The statistical method may, for example, be based on training corpus that is manually labeled to train a model. Example statistical methods may be conditional random method, hidden Markov model etc.

The document retrieval system 101 may determine in step 207 that a set of one or more attribute values (named SET) of the extracted attribute values is comprised in the set of datasets. This may, for example, be performed by searching in the identified set of datasets whether extracted attribute values belong to the set of datasets. Following the database example, the created index may be queried to search if any of the extracted attribute values are found in one of the set of datasets. If for example, none of the extracted attribute values is comprised in the set of datasets, the document retrieval system 101 may perform the classification-based masking method on the requested document and the resulting masked document may be provided.

The document retrieval system 101 may determine (step 209) whether one or more entities of the sensitive dataset can be identified based on relations of the relational model between the set of attributes, wherein at least part of the attribute values of the one or more entities may comprise sensitive information. Following the database example, the document retrieval system 101 may follow relationships between the structured tables to find out if the rows identified as containing the set of attribute values SET may be joined directly or indirectly to associate them to PII/sensitive fields of the sensitive dataset. In one example, the one or more entities may be a single entity. In another example, the one or more entities may comprise a number of entities that can reveal sensitive information e.g., on a group of users. The minimum number (N) of the entities that may be combined or reconstructed without accessing sensitive information may depend on the data protection policies in place. One policy may indicate that the access to the information of a single individual may violate access rules and thus said information may be sensitive information according to the policy. Another policy may consider a privacy violation if the number of individuals/entities that can be resolved is smaller than N, where N>2.

In case the one or more entities may be identified, document retrieval system 101 may mask at least part of the set attribute values SET in step 211. Moreover, the classification-based masking approach may be performed in order to mask the sensitive information based on the classification. Performing the two masking methods may be advantageous for the following reasons. For example, if a document masked according to the classification based method contains information like "XXXXXXX has called on May 1, 2019 our call center to order 31 "Company A" shares and . . . ", the masking of the name of the customer may not be advantageous if there is another source of data that can indicate that only one customer ordered 31 "Company A" shares on May 1, 2019 and that source of data contains the name of the customer. In other words, the non-sensitive attribute values such as the date may be used to reconstruct or find the customer name in another data source. Hence, the present approach may enable a proper masking by masking more information (for instance the date of the transaction) in order to be compliant with the data protection rules, although the class associated with said date may not be sensitive.

In one example, all the set of attribute values SET may be masked. In another example, only one or more attribute values of the set of attribute values may be masked such that the remaining non-masked attribute values of the set of attribute values do not enable to identify the one or more entities using relations between them. For example, the masking may be performed via hashing. Here, an attribute value may be hashed together with a long-term hash key. The attribute value may then be replaced with the resulting hash value in the masked document sent to the user. Other known methods which are based on substitution, shuffling, deletion ("nulling"), obfuscation, or perturbation techniques may be used for performing the masking.

Document retrieval system 101 may provide the masked document in step 213. For example, the document retrieval system 101 may send in response to the request the masked document to the user computer system 102.

Figure 3A:
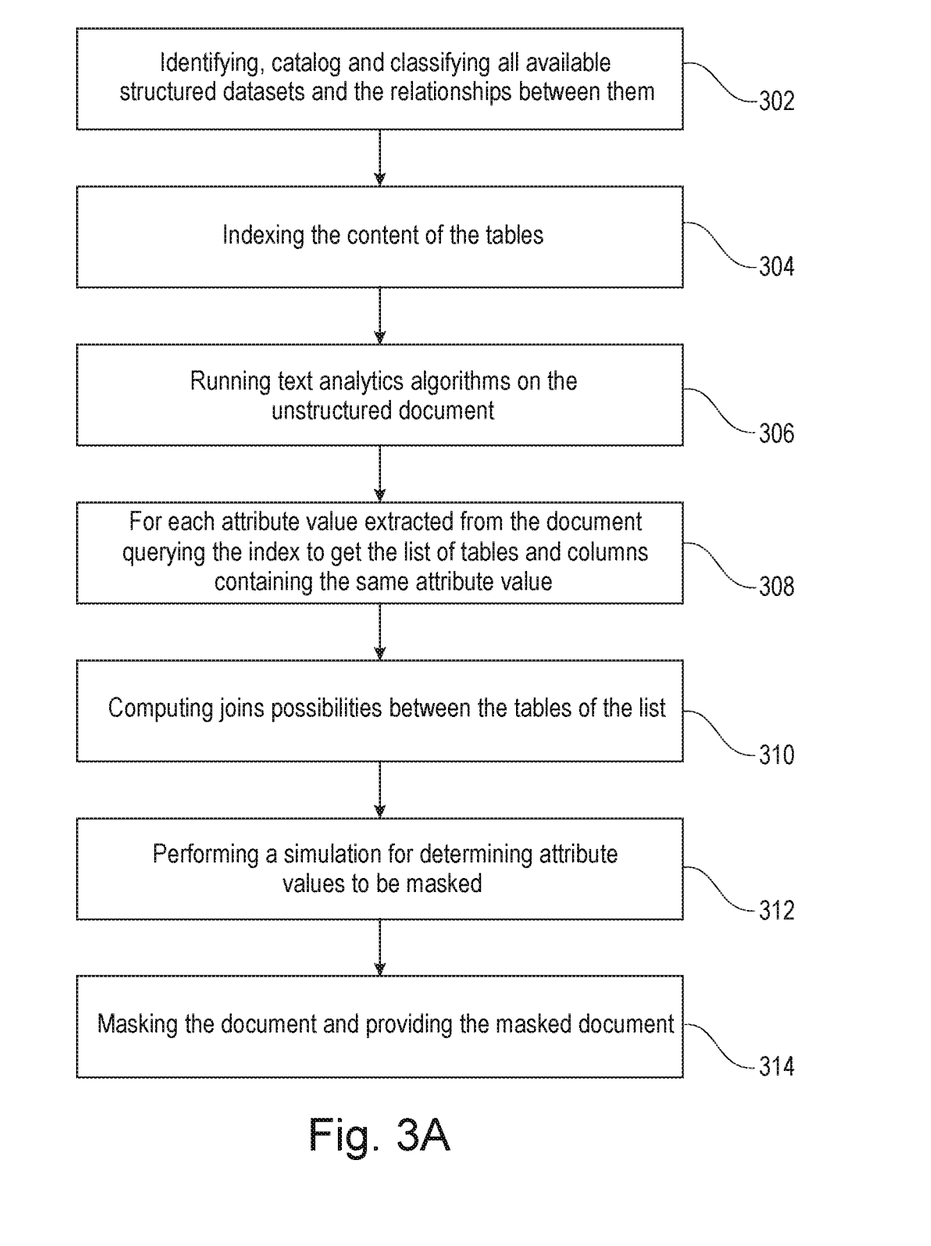
FIG. 3A is a flowchart of an approach for protecting sensitive information in accordance with an embodiment of the present invention.

FIG. 3A is a flowchart of an approach for protecting sensitive information in a document. For the purpose of explanation, the approach described in FIG. 3A may be implemented in the system illustrated in FIG. 1, but is not limited to this implementation.

Figure 3B:
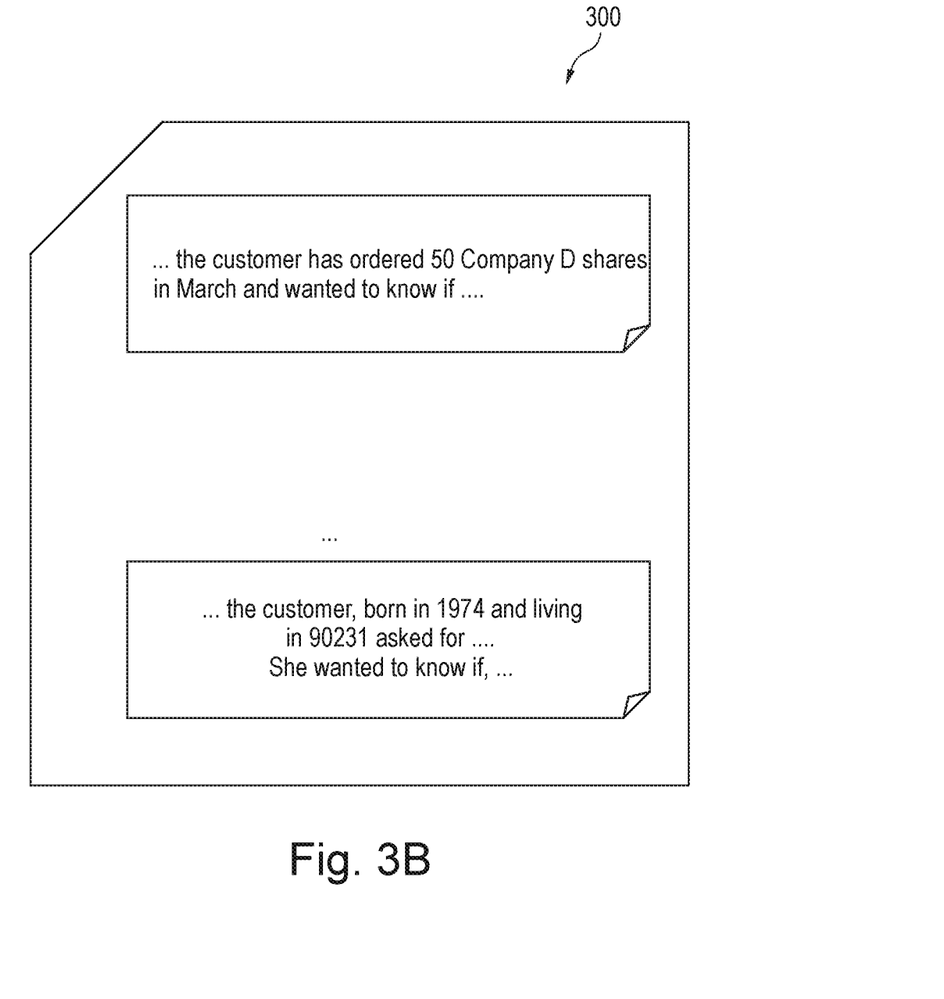
FIG. 3B depicts a document in accordance with an embodiment of the present invention.

The approach of FIG. 3A may be used to protect a document. FIG. 3B shows an example document 300. The document 300 may be an unstructured document comprising text passages as shown in FIG. 3B.

Figure 3C:
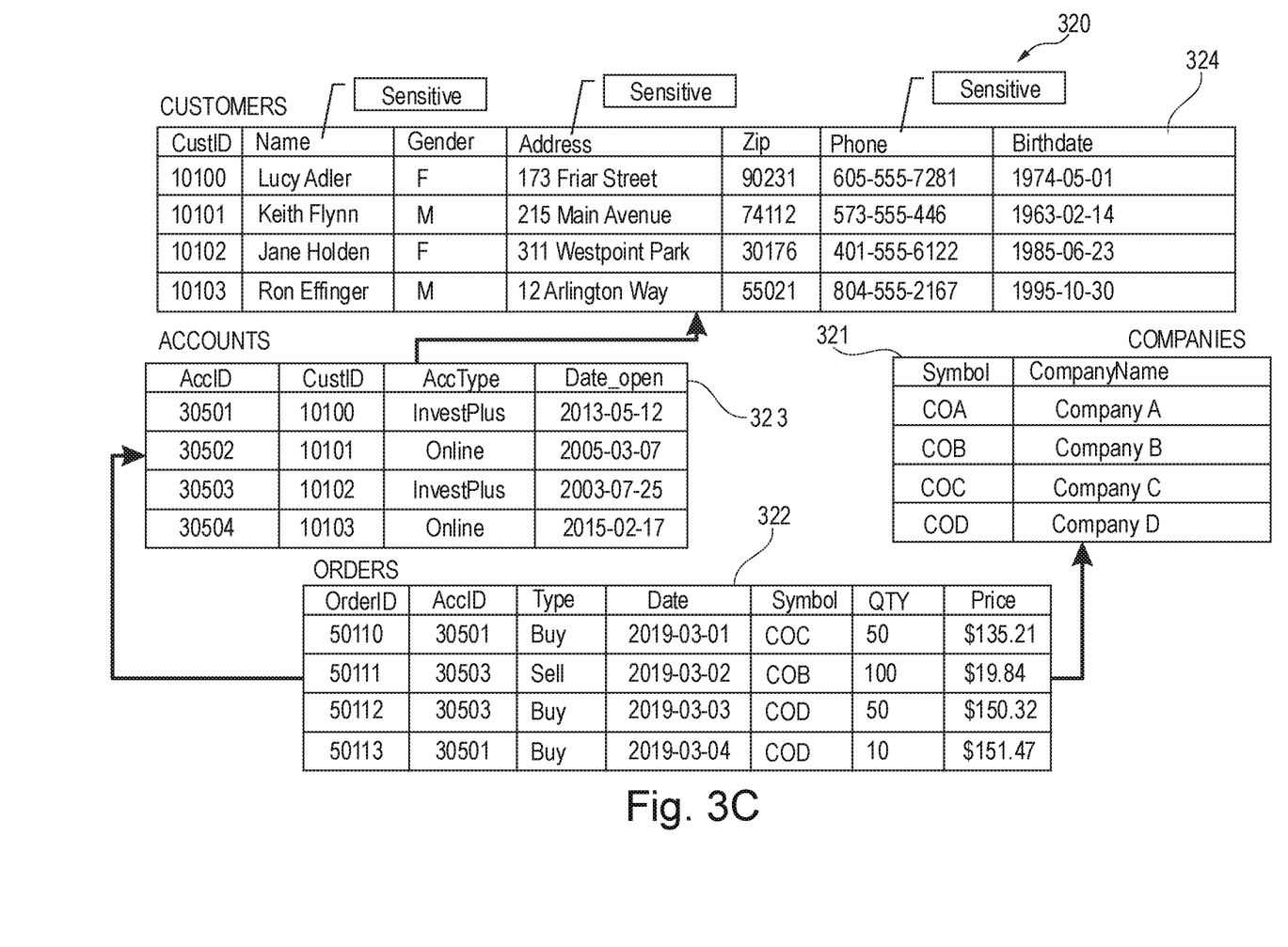
FIG. 3C depicts a set of datasets in accordance with an embodiment of the present invention.

In step 302, the system identifies, catalogs, and classifies all available structured datasets and the relationships (PF-FK relationships) between them. For example, all available structured datasets may be the datasets 109.1 through 109.$n$ of the data storage systems 107$a$ through 107.$n$ Respectively. Classifying Structured Data Sets and Identifying all Possible relationships in a group of datasets may be performed using methods such as a Holistic Primary Key and Foreign Key Detection (HoPF) method. FIG. 3C depicts an example of a set of tables 320 and their identified relationships. The set of tables 320 comprises a table 321 comprising entities indicative of companies. For example, the table 321 may comprise attributes such as company name attribute and company symbol attribute. The set of tables 320 further comprises a table 322 comprising entities indicative of orders. For example, the table 322 may comprise attributes such as the order ID attribute, the access ID attribute, the symbol of the company that served the order etc. As indicated in FIG. 3C, the two tables 321 and 322 are related to each other as they share the same column or attribute which is the company symbol attribute. This relationship may enable to link some entities of the table 321 to entities of the other table 322. For example, the order having order ID 50113 is served by a company named "Company D" as can be derived from the relationship. The set of tables 320 comprises a table 323 comprising entities indicative of customer accounts. For example, the table 323 may comprise attributes such as a customer ID attribute, access ID attribute, the account opening date attribute etc. As indicated in FIG. 3C, the two tables 323 and 322 are related to each other as they share the same column or attribute which is the access ID attribute. This relationship may enable to link some entities of the table 322 to entities of the other table 323. For example, the order having order ID 50113 that is served by the company named "Company D" may be linked to the customer ID 10100 as can be derived from the relationship. The set of tables 320 comprises a table 324 which is a sensitive table comprising entities indicative of customers. For example, the table 324 may comprise attributes such as a customer ID attribute, the name attribute, the address attribute etc. As indicated in FIG. 3C, the two tables 324 and 323 are related to each other as they share the same column or attribute which is the customer ID attribute. This relationship may enable to link some entities of the table 324 to entities of the other table 323. For example, the order having order ID 50113 and made by a customer having the customer ID 10100 and that is served by the company named "Company D" is an order that has been made by the customer whose name is Lucy Adler as can be derived from the relationship. The classification of the set of tables 320 may cover at least the identification of the sensitive information which need to be protected. For instance, the classification process may identify that the information that should be protected are different columns of the table 324 representing customer entities.

In step 304, the system indexes the content of the set of tables 320 (for example in an index like Solr or Elastic Search index). Each cell of each table of the set of tables 320 may be indexed in a separate document containing the attribute value as well as the reference of the column and table where this attribute value can be found. For example, the table 322 may be indexed by sending the following documents to a Solr engine:

{"id":"1", "table":"ORDERS", "column":"OrderId", "stringValue":"50110"}
{"id":"2", "table":"ORDERS", "column":"OrderId", "stringValue":"50111"}
. . .
{"id":"150", "table":"ORDERS", "column":"Date", "dateValue":"2019-03-01"}
. . .
{"id":"170", "table":"ORDERS", "column":"QTY", "integerValue":50}
. . .

If a more detailed classification of the columns exists, the information about the classification can be added to the index in order to improve the accuracy/performance of the next steps.

Figure 3D:
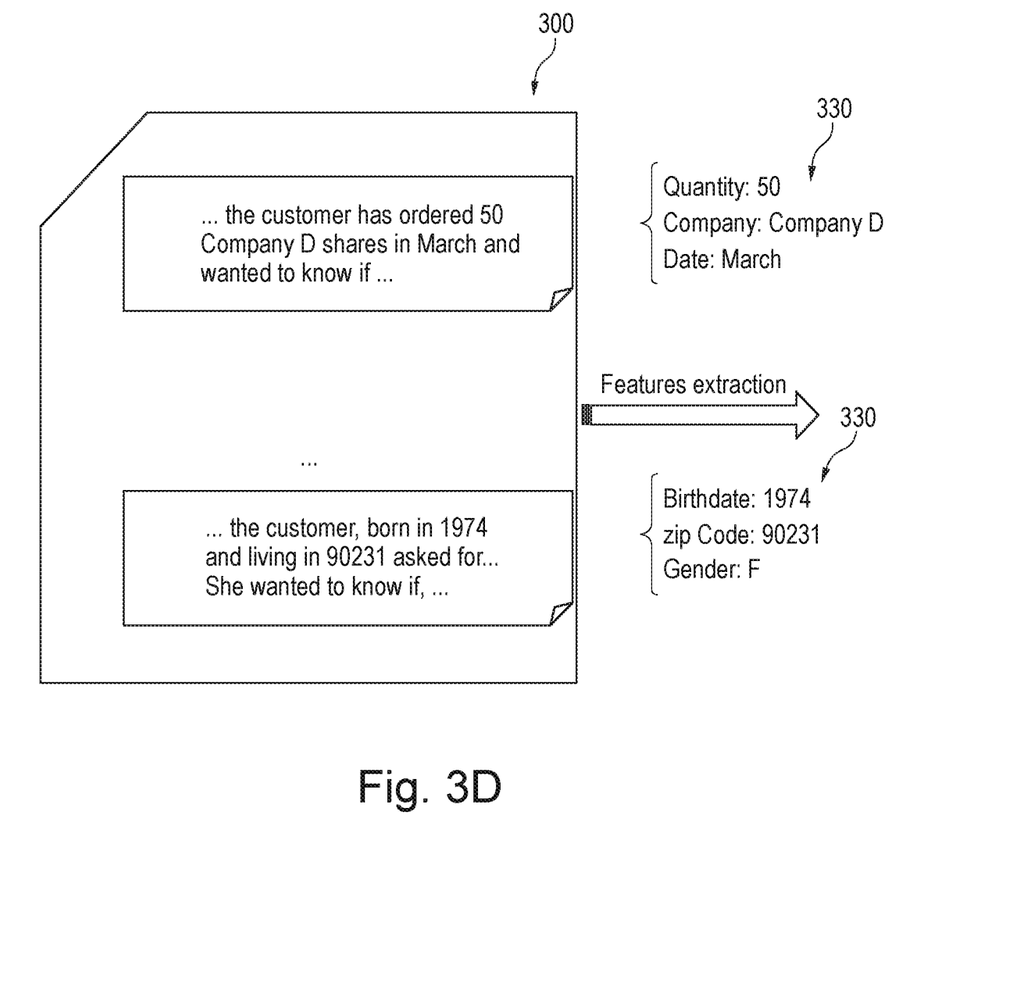
FIG. 3D is a diagram illustrating a method of extracting attribute values from the document in accordance with an embodiment of the present invention.

Once the index of the structured information is ready, an analysis of the document 300 may be performed. This is done by first running text analytics algorithms on the unstructured document 300, so that the system can extract attribute values in step 306 out of the document 300. As shown in FIG. 3D, on the left-hand side the content of the document 300 is shown and on the right-hand side the attribute values 330 that may have been extracted out of the document 300. The extracted attribute values 330 may, for example, be the company name, a date, a quantity etc.

For each attribute value 330 extracted from the document 300, the system may query the Solr index in step 308 to get the list of tables and columns containing the same attribute value. Once the list of tables containing any attribute value from the document 300 has been identified, the system may compute possibilities on how these tables can be joined together and how they can be joined with any table containing sensitive information in step 310. Following the example of attribute values of FIG. 3D, the result of the index query will indicate the following:

Quantity:50 can be found in ORDERS.QTY
Company:Company D can be found in COMPANIES.CompanyName
Date: March can be found in ORDERS.Date and ACCOUNTS.Date_open Thus, the identified tables where attribute values are stored are tables 121, 122 and 123, named ORDERS, COMPANIES and ACCOUNTS. However, the previously identified relationships show that these tables can be joined together and that they can additionally be joined to the table CUSTOMERS 324, which contains sensitive information. If a path to sensitive information has been identified from any table containing an attribute value extracted from the document, result sets may be computed by joining the identified tables 321-323 with the tables containing sensitive information, using as filter predicates the attribute values 330 extracted from the document 300. The result set may be verified in order to determine whether it would lead to a governance rule violation (e.g., individuals can be uniquely identified) or not (a result of the joins doesn't lead to unique individuals).

In the present example of FIG. 3C, there is only one way to joins the tables with each other. The result set to test would be the result of this query:

SELECT COUNT(*) FROM ORDERS
INNER JOIN COMPANIES ON COMPANIES.SYMBOL=ORDERS.SYMBOL
INNER JOIN ACCOUNTS ON ORDERS.ACCID=ACCOUNTS.ACCID
INNER JOIN CUSTOMERS ON ACCOUNTS.CUSTID=CUSTOMERS.CUSTID
WHERE ORDERS.QTY=50 AND COMPANIES.COMPANYNAME='COMPANY D' AND MONTH(ORDERS.DATE)=3

The result of this query would lead to only one row containing sensitive information from the CUSTOMERS table 324, which would be a violation of the governance rules.

Hence, the extracted attribute values 330 may need to be masked in order to protect the document 300. The present approach may improve the masking by determining the minimum number of those extracted attribute values that can be masked so as to prevent reconstructing said row. For that, the system may perform a simulation in step 312. The simulation may determine how a virtual result set would look like if any extracted attribute value (or combination of attribute values) would be masked, and verify if the simulated results sets violate the governance rules or not. That is, an extracted attribute value of the extracted attribute values may be masked and the remaining attribute values may be used to join the tables and the resulting result set may be the virtual result set. The best masking method (e.g., that masks the smallest possible number of attribute values that would lead to a violation of the governance rules) may be chosen to mask the document (where the masking is reduced to a minimum or where the attributes which are relevant for the analytics intent of the user are not masked) and the system may send the resulting masked document in step 314 to the user.

Figure 4:
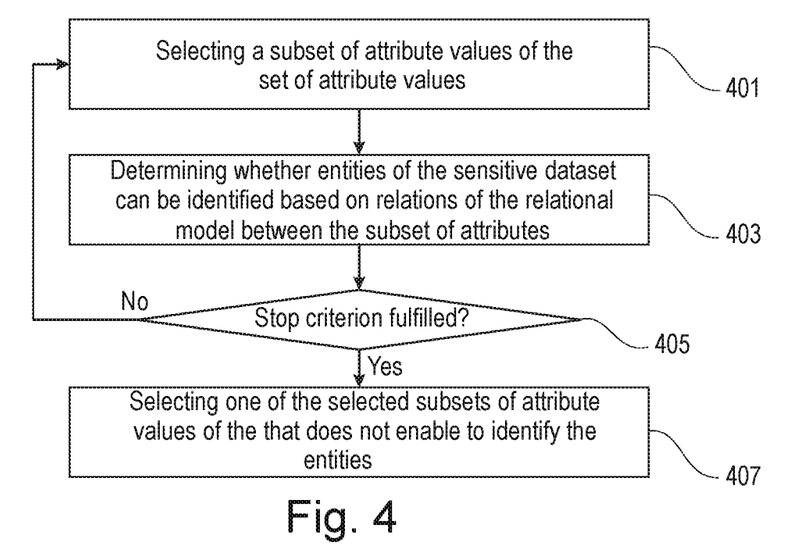
FIG. 4 is a flowchart of an approach for determining attribute values to be masked in accordance with an embodiment of the present invention.

FIG. 4 is a flowchart of an approach for determining attribute values to be masked in accordance with an example of the present subject matter. The approach of FIG. 4 is an example implementation detail of step 211 of FIG. 2. In particular, the approach of FIG. 4 enables to define the at least part of the set of attribute values to be masked in step 211.

In step 401, the process may select a subset of the set of attribute values from the set of attribute values. For example, one or more attribute values may be excluded from the set of attribute values in order to obtain the subset.

The process may determine, in step 403, whether one or more entities of the sensitive dataset can be identified based on relations of the relational model between the subset of attributes, wherein at least part of attribute values of the one or more entities comprises sensitive information. Step 403 may be performed as described with reference to step 209 of FIG. 2.

The process may determine, in step 405, whether a stopping criterion is fulfilled. The stopping criterion may, for example, require that the number of iterations is higher than a threshold. In another example, the stopping criterion may require that the number of selected subsets that do not enable to identify the one or entities in the sensitivity dataset is higher than a predefined minimum number.

In case the stopping criterion is not fulfilled, the process may repeat in steps 401 to 405. In case the stopping criterion is fulfilled, the process may select one of the selected subsets that not enable to identify the one or more entities in the sensitivity dataset in step 407. The selected subset of step 407 may be the subset having the highest number of attribute values. This may enable to protect sensitive information while keeping as much non sensitive information as possible, so that the document may still be evaluated by a requestor of the document. In another example, the selected subset of step 407 may be a randomly selected subset. The at least part of the set of attribute values to be masked in step 211 of FIG. 2 may be the set of attributes excluding the selected subset of step 407.

Figure 5:
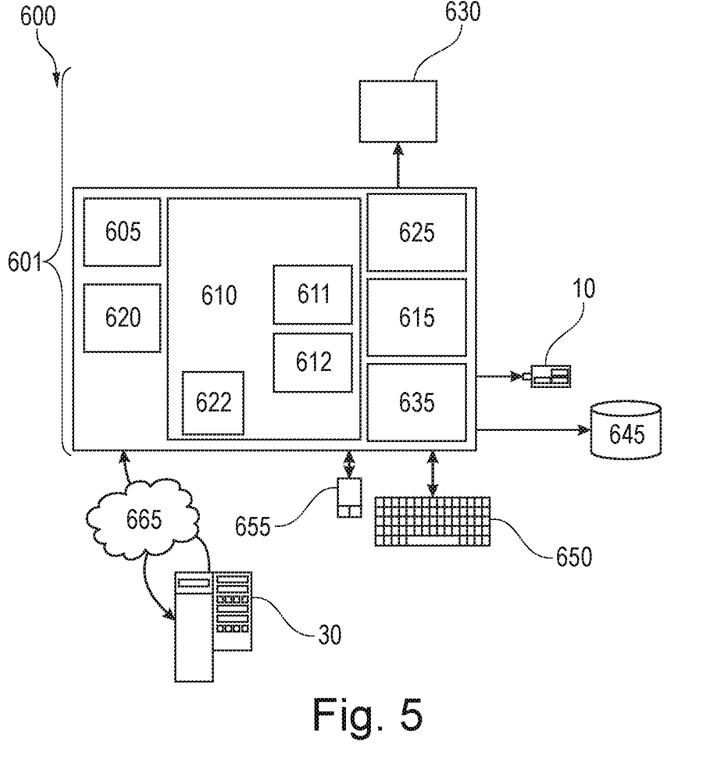
FIG. 5 represents a computer system, suited for implementing one or more embodiments of the present invention.

FIG. 5 represents a general computerized system 600 suited for implementing at least part of method steps as involved in the disclosure.

It will be appreciated that the approaches described herein are at least partly non-interactive, and automated by way of computerized systems, such as servers or embedded systems. In exemplary embodiments though, the methods described herein can be implemented in a (partly) interactive system. These approaches can further be implemented in software 612, 622 (including firmware 622), hardware (processor) 605, or a combination thereof. In exemplary embodiments, the methods described herein are implemented in software, as an executable program, and is executed by a special or general-purpose digital computer, such as a personal computer, workstation, minicomputer, or mainframe computer. The most general system 600 therefore includes a general-purpose computer 601.

In exemplary embodiments, in terms of hardware architecture, as shown in FIG. 5, the computer 601 includes a processor 605, memory (main memory) 610 coupled to a memory controller 615, and one or more input and/or output (I/O) devices (or peripherals) 10, 645 that are communicatively coupled via a local input/output controller 635. The input/output controller 635 can be, but is not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 645 may generally include any generalized cryptographic card or smart card known in the art.

The processor 605 is a hardware device for executing software, particularly that stored in memory 610. The processor 605 can be any custom made or commercially available processor, a central processing unit (CPU), an auxiliary processor among several processors associated with the computer 601, a semiconductor based microprocessor (in the form of a microchip or chip set), a macroprocessor, or generally any device for executing software instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 610 can have a distributed architecture, where various components are situated remote from one another, but can be accessed by the processor 605.

The software in memory 610 may include one or more separate programs, each of which comprises an ordered listing of executable instructions for implementing logical functions, notably functions involved in embodiments of this invention. In the example of FIG. 5, software in the memory 610 includes software 612, e.g., instructions to manage databases such as a database management system.

The software in memory 610 shall also typically include a suitable operating system (OS) 411. The OS 611 essentially controls the execution of other computer programs, such as possibly software 612 for implementing methods as described herein.

The approaches described herein may be in the form of a source program, executable program (object code), script, or any other entity comprising a set of instructions to be performed. When a source program, then the program needs to be translated via a compiler, assembler, interpreter, or the like, which may or may not be included within the memory 610, so as to operate properly in connection with the OS 611. Furthermore, the methods can be written as an object-oriented programming language, which has classes of data and methods, or a procedure programming language, which has routines, subroutines, and/or functions.

In exemplary embodiments, a conventional keyboard 650 and mouse 655 can be coupled to the input/output controller 635. Other output devices such as the I/O devices 645 may include input devices, for example but not limited to a printer, a scanner, microphone, and the like. Finally, the I/O devices 10, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 645 can be any generalized cryptographic card or smart card known in the art. The system 600 can further include a display controller 625 coupled to a display 630. In exemplary embodiments, the system 600 can further include a network interface for coupling to a network 665. The network 665 can be an IP-based network for communication between the computer 601 and any external server, client and the like via a broadband connection. The network 665 transmits and receives data between the computer 601 and external systems 30, which can be involved to perform part, or all of the steps of the methods discussed herein. In exemplary embodiments, network 665 can be a managed IP network administered by a service provider. The network 665 may be implemented in a wireless fashion, e.g., using wireless protocols and technologies, such as Wi-Fi, WiMAX, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the software in the memory 610 may further include a basic input output system (BIOS) included in firmware 622. The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the processor 605 is configured to execute software 612 stored within the memory 610, to communicate data to and from the memory 610, and to generally control operations of the computer 601 pursuant to the software. The methods described herein and the OS 611, in whole or in part, but typically the latter, are read by the processor 605, possibly buffered within the processor 605, and then executed.

When the systems and methods described herein are implemented in software 612, as is shown in FIG. 5, the methods can be stored on any computer readable medium, such as storage 620, for use by or in connection with any computer related system or method. The storage 620 may comprise a disk storage such as HDD storage.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   creating a Solr index of a set of datasets of a database system such that each cell of each table is indexed in a separate document, each separate document containing, for a single cell, a corresponding attribute value as well as a reference to a column and table where the corresponding attribute value is located;
   receiving a request for an unstructured electronic document;
   identifying that the set of datasets comprise a sensitive dataset, the set of datasets being interrelated in accordance with a relational model utilizing a Holistic Primary Key and Foreign Key Detection (HoPF) algorithm, wherein relationships are based on presence of a primary foreign key (PK-FK) relationship between datasets;
   extracting attribute values of the unstructured electronic document utilizing text analytics;
   querying, by one or more processors, the Solr index to determine that a set of one or more attribute values of the extracted attribute values is in the set of datasets, the set of attribute values being values of a set of attributes, respectively;
   determining that one or more entities of the sensitive dataset can be identified based on relations of the relational model among datasets of the set of datasets and attributes of each dataset, wherein:
      at least part of attribute values of the one or more entities comprises sensitive information; and determining that the one or more entities of the sensitive dataset can be identified comprises determining that a non-masking of one or more attribute values of the one or more entities violates a data access rule, wherein:
  the at least part of attribute values of the one or more entities are values of the set of attributes; and
  the data access rule indicates which attribute values may not be accessed from: (i) a location of a requestor of the document and (ii) a time of request;
responsive to determining that the one or more entities can be identified, masking at least part of the set of one or more attribute values in the unstructured electronic document, wherein the masking of the at least part of the set of one or more attribute values comprises:
  iteratively, in a plurality of iterations, determining that the one or more entities of the sensitive dataset can be identified, wherein:
    in each iteration a reduced set of attributes is used as compared to each prior iteration;
    the reduced set of attributes is obtained by excluding an additional attribute from the set of attributes of the prior iteration; and
    a final iteration results in one or more reduced sets of attributes that hide identification of one or more entities;
  selecting a reduced set of the resulting reduced sets, wherein the at least part of the set of attribute values are values of the set of attributes excluding values present within the selected reduced set; and
  replacing, in the masked unstructured electronic document, each attribute of the reduced set with a hash value derived by hashing a respective attribute with a long-term hash key; and
providing the masked unstructured electronic document.

2. The computer-implemented method of claim 1, wherein the selected reduced set is the reduced set with a highest number of attributes of the resulting reduced sets.

3. The computer-implemented method of claim 1, wherein the iterations are performed until a number of resulting reduced sets of attributes is higher than a predefined minimum number.

4. The computer-implemented method of claim 1, further comprising:
  classifying the extracted attribute values; and
  masking each attribute value of the extracted attribute values that is classified as sensitive attribute value.

5. The computer-implemented method of claim 1, further comprising:
  determining a domain represented by a content of the document, wherein the set of datasets represent the determined domain.

6. The computer-implemented method of claim 1, wherein each table is of a relational database.

7. The computer-implemented method of claim 6, wherein determining that the one or more entities of the sensitive dataset can be identified comprises:
  joining tables of the set of datasets that comprise the set of one or more attribute values; and
  determining whether the joining results in one or more records of the sensitive dataset, the one or more records representing the one or more entities.

8. A computer program product comprising:
one or more computer readable storage devices, and program instructions collectively stored on the one or more computer readable storage devices, the program instructions comprising:
program instructions to create a Solr index of a set of datasets of a database system such that each cell of each table is indexed in a separate document, each separate document containing, for a single cell, a corresponding attribute value as well as a reference to a column and table where the corresponding attribute value is located;
program instructions to receive a request for an unstructured electronic document;
program instructions to identify that the set of datasets comprise a sensitive dataset, the set of datasets being interrelated in accordance with a relational model utilizing a Holistic Primary Key and Foreign Key Detection (HoPF) algorithm, wherein relationships are based on presence of a primary foreign key (PK-FK) relationship between datasets;
program instructions to extract attribute values of the unstructured electronic document utilizing text analytics;
program instructions to query the Solr index to determine that a set of one or more attribute values of the extracted attribute values is in the set of datasets, the set of attribute values being values of a set of attributes, respectively;
program instructions to determine that one or more entities of the sensitive dataset can be identified based on relations of the relational model among datasets of the set of datasets and attributes of each dataset, wherein:
  at least part of attribute values of the one or more entities comprises sensitive information; and
  program instructions to determine that the one or more entities of the sensitive dataset can be identified comprise program instructions to determine that a non-masking of one or more attribute values of the one or more entities violates a data access rule, wherein:
    the at least part of attribute values of the one or more entities are values of the set of attributes; and
    the data access rule indicates which attribute values may not be accessed from: (i) a location of a requestor of the document and (ii) a time of request;
program instructions to, responsive to determining that the one or more entities can be identified, mask at least part of the set of one or more attribute values in the unstructured electronic document, wherein the masking of the at least part of the set of one or more attribute values comprises:
  iteratively, in a plurality of iterations, determining that the one or more entities of the sensitive dataset can be identified, wherein:
    in each iteration a reduced set of attributes is used as compared to each prior iteration;
    the reduced set of attributes is obtained by excluding an additional attribute from the set of attributes of the prior iteration; and
    a final iteration results in one or more reduced sets of attributes that hide identification of one or more entities;
  selecting a reduced set of the resulting reduced sets, wherein the at least part of the set of attribute values are values of the set of attributes excluding values present within the selected reduced set; and replacing, in the masked unstructured electronic document, each attribute of the reduced set with a hash value derived by hashing a respective attribute with a long-term hash key; and program instructions to provide the masked unstructured electronic document.

9. The computer program product of claim 8, wherein the selected reduced set is the reduced set with a highest number of attributes of the resulting reduced sets.

10. The computer program product of claim 8, wherein the iterations are performed until a number of resulting reduced sets of attributes is higher than a predefined minimum number.

11. The computer program product of claim 8, further comprising:

program instructions, collectively stored on the one or more computer readable storage devices, to classify the extracted attribute values; and program instructions, collectively stored on the one or more computer readable storage devices, to mask each attribute value of the extracted attribute values that is classified as sensitive attribute value.

12. A computer system comprising:

a computer processor set;

a set of one or more computer readable storage devices storing program instructions executable by the computer processor set;

program instructions to create a Solr index of a set of datasets of a database system such that each cell of each table is indexed in a separate document, each separate document containing, for a single cell, a corresponding attribute value as well as a reference to a column and table where the corresponding attribute value is located;

program instructions to receive a request for an unstructured electronic document;

program instructions to identify that the set of datasets comprise a sensitive dataset, the set of datasets being interrelated in accordance with a relational model utilizing a Holistic Primary Key and Foreign Key Detection (HoPF) algorithm, wherein relationships are based on presence of a primary foreign key (PK-FK) relationship between datasets;

program instructions to extract attribute values of the unstructured electronic document utilizing text analytics;

program instructions to query the Solr index to determine that a set of one or more attribute values of the extracted attribute values is in the set of datasets, the set of attribute values being values of a set of attributes, respectively;

program instructions to determine that one or more entities of the sensitive dataset can be identified based on relations of the relational model among datasets of the set of datasets and attributes of each dataset, wherein:

at least part of attribute values of the one or more entities comprises sensitive information; and program instructions to determine that the one or more entities of the sensitive dataset can be identified comprise program instructions to determine that a non-masking of one or more attribute values of the one or more entities violates a data access rule, wherein:

the at least part of attribute values of the one or more entities are values of the set of attributes; and the data access rule indicates which attribute values may not be accessed from: (i) a location of a requestor of the document and (ii) a time of request;

program instructions to, responsive to determining that the one or more entities can be identified, mask at least part of the set of one or more attribute values in the unstructured electronic document, wherein the masking of the at least part of the set of one or more attribute values comprises:

iteratively, in a plurality of iterations, determining that the one or more entities of the sensitive dataset can be identified, wherein:

in each iteration a reduced set of attributes is used as compared to each prior iteration;

the reduced set of attributes is obtained by excluding an additional attribute from the set of attributes of the prior iteration; and a final iteration results in one or more reduced sets of attributes that hide identification of one or more entities;

selecting a reduced set of the resulting reduced sets, wherein the at least part of the set of attribute values are values of the set of attributes excluding values present within the selected reduced set; and replacing, in the masked unstructured electronic document, each attribute of the reduced set with a hash value derived by hashing a respective attribute with a long-term hash key; and program instructions to provide the masked unstructured electronic document.

* * * * *